United States Patent Office 3,149,098
Patented Sept. 15, 1964

3,149,098
THREE-COMPONENT CATALYST FOR 1-OLEFIN POLYMERIZATION CONTAINING ALUMINUM ALKYL HALIDE, TITANIUM TRICHLORIDE AND AN ORTHOESTER
John A. Price, Swarthmore, and Harold T. Smallwood, Media, Pa., assignors to Avisun Corporation, Philadelphia, Pa., a corporation of Delaware
No Drawing. Filed Feb. 27, 1962, Ser. No. 176,086
19 Claims. (Cl. 260—93.7)

This invention relates to a novel catalyst system for the polymerization of propylene and higher alpha-olefins, and more particularly to a three-component catalyst system consisting for example of alkyl aluminum sesquihalide or dihalide, titanium trichloride and an orthoester as the third component.

It is known that alpha-olefins may be polymerized in the presence of catalysts comprising a transition metal halide such as titanium chloride in combination with an aluminum alkyl or dialkyl aluminum halide such as triethyl aluminum or diethyl aluminum monochloride to form solid crystalline polymers having utility in the fabrication of shaped articles, films, and fibers. However, it has not been found possible heretofore to use an alkyl aluminum dihalide or sesquihalide as an active component of this type of catalyst system even though these compounds are much less expensive than the alkyl aluminum compounds used thus far. Thus, Stuart and Khelghatian show in U.S. Patent 2,967,206 that alkyl aluminum dihalides in conjunction with titanium halides effect polymerization of propylene and higher olefins to oily polymers, but that no solid polymers are disclosed therein as resulting from the use of this catalyst system. While some solid polymer may be obtained using an aluminum sesquihalide-titanium trichloride catalyst, the yields are very low, and these catalysts are not of commercial interest. In recent years, many investigators have found that the addition of coordinating agents to organometallic transition-metal halide catalyst systems improved the stereo-symmetry of the polymer. Coover and Shearer (U.S. 2,951,066) used triphenylarsine in combination with ethyl aluminum sesquichloride and titanium trichloride. Coover and Joyner (U.S. 2,958,688) employed trialkylphosphites, trialkylphosphates and hexaalkylphosphoric triamides. Thomas (U.S. 2,909,511) pretreated alkyl aluminum halides with groups IA and IIA metal halides prior to the addition of titanium trichloride in order to obtain greatly improved rates of polymerization and/or improved yields of crystalline polymer.

It is an object of this invention to provide a coordination catalyst system, utilizing an alkyl aluminum dihalide or sesquihalide as the organometallic component of the catalyst, which will polymerize propylene and higher olefins to solid crystalline polymers in commercially attractive yields.

It is an object of this invention to provide an improved olefin polymerization catalyst consisting of alkyl aluminum dichloride or sesquichloride, pretreated with an orthoester before adding titanium trichloride.

Another object of this invention is the utilization of potentially cheap aluminum compounds, such as ethyl aluminum dichloride and ethyl aluminum sesquichloride in the polymerization of alpha-olefins.

It has been found according to the present invention that a catalyst system containing titanium trichloride, an alkyl aluminum dihalide or sesquihalide and an orthoester is effective in polymerizing propylene, and other 1-alkenes containing 2 to 20 carbon atoms and free from branching at the 2 position, to solid crystalline polymers. In a specific embodiment of this invention, an activated titanium trichlorde is used wth the orthoester and the alkyl aluminum dihalide or sesquihalide. This activated titanium trichloride is defined herein as being predominantly amorphous and may be prepared by ball, or rod, milling crystalline titanium trichloride, prepared by the reduction of titanium tetrachloride with hydrogen or aluminum until, as determined by X-ray diffraction, it possesses less than 30% of the crystalline structure of the crystalline titanium trichloride prior to ball or rod milling. In practice, the amount of crystallinity is generally 20% or less, and preferably it is 10% or less. Unlike the crystalline titanium trichloride from which it is derived, the predominately amorphous titanium trichloride will catalyze the preparation of solid polymers of propylene and higher 1-alkenes when it is used in combination with an alkyl aluminum dihalide or sesquihalide. However, the amount of solid polymer so prepared is exceedingly small and such solid polymers can be obtained with such a system only when large, uneconomical amounts of the catalyst composition are used. It has been found, according to the present invention, that increases in polymerization yields as high as thirty fold may be obtained with the catalyst system containing an alkyl aluminum dihalide and predominantly amorphous titanium trichloride by complexing this system with an orthoester.

In carrying out polymerizations in accordance with the present invention, the catalyst components are generally dissolved or suspended in an inert hydrocarbon solvent such as hexane, heptane, or octane, or mixtures thereof, in an appropriate reaction vessel, in the absence of oxygen and moisture. The catalyst-containing solvent is then usually brought to a temperature in the range of 25° C. to 150° C., preferably 60° C. to 80° C., and the olefin to be polymerized is introduced into the reaction vessel. When the olefin is a liquid at reaction temperatures, such as 4-methylpentene-1, atmospheric pressure may be used, but when the olefin is normally gaseous, such as propylene or butene-1, moderately elevated pressures are preferably used, as from 20 p.s.i.g. to 500 p.s.i.g., in order to increase the amount of olefin dissolved in the solvent, and thus speed the reaction.

The aluminum component of the catalyst system of this invention may be any alkyl aluminum dihalide, e.g. ethyl aluminum dichloride, propyl aluminum dichloride, butyl aluminum dichloride, or the corresponding bromine or iodine analogues, or sesquihalides such as aluminum ethyl sesquichloride or propyl sesquichloride as well as alkyl aluminum dihalides or sesquihalides, the alkyl radicals of which contain greater numbers of carbon atoms than those illustrated above. The orthoester component suitable for this invention has the general formula $ZC(OR)_3$ wherein Z is a lower alkyl or alkoxy group having 1 to 4 carbon atoms and R is a lower alkyl group having 1 to 4 carbon atoms. The mol ratio of the alkyl aluminum compound to the orthoester should be generally from about 1.5 to about 6:1. A practical working ratio lies in the range 2.5:1 to 4:1. The mol ratio of alkyl aluminum dihalide or sesquihalide to titanium trichloride in the catalyst system should be generally from 0.2:1 to 10:1, and is preferably from about 1.5:1 to 4:1.

In order that those skilled in the art may more fully appreciate the nature of my invention and the manner of carrying it out, the following examples are given. In all examples the titanium component of the catalyst system was prepared by reducing titanium tetrachloride with aluminum and then ball milling the resultant titanium trichloride until its crystallinity was below about 10% of the original titanium trichloride as determined by X-ray analysis.

*Example 1*

A polymer bottle was charged with 0.057 ml. (0.053 gram) of trimethyl orthoacetate ($CH_3C(OCH_3)_3$), 50 ml. of heptane, 1.85 ml. of 0.97 M ethyl aluminum dichloride in heptane and agitated at room temperature for 30 minutes. These elements represent a mol ratio of 4:1 of the ethyl aluminum dichloride to the trimethyl orthoacetate. The bottle was then charged with 2 paraffin pellets each containing 0.069 gram of TiCl₃. After aging at room temperature for 30 minutes the bottle was put in the 72° C. bath and the slurry was pressured with 40 p.s.i.g. of propylene for 4 hours. The unreacted propylene was vented and the cooled slurry was diluted with 10 ml. of methanol and 50 ml. of heptane. The polymer was collected on a sintered glass funnel, washed with 100 ml. portions of heptane, isopropanol, methanol, and dried in a vacuum oven overnight at 60° C. The yield of dry, white powdery polymer amounted to 2.7 grams. The reduced solution viscosity (RSV) of 0.1 gram of polymer in 100 ml. of Decalin at 135° C. was 4.3. The residue from evaporation of the combined heptane solutions weighed 0.6 gram.

*Comparative Example A*

A heavy-walled, pressure-type polymer bottle having a capacity of 185 mls. was charged with 50 ml. heptane, 1.49 ml. of a 1.05M solution of ethyl aluminum dichloride in heptane and 2 paraffin pellets of TiCl₃ each containing 0.063 gram of TiCl₃. The bottle was sealed with a crown cap containing an oil-resistant liner and placed in a constant temperature bath maintained at 72° C. Agitation was accomplished by means of a Teflon-coated magnetic stirrer.

After aging for 20 minutes, the bottle was pressured with 40 p.s.i.g. of propylene which was maintained for a period of 4 hours. The unreacted propylene was vented and the cooled slurry was diluted with 10 ml. of methanol and 50 ml. of heptane. The polymer was collected on a sintered glass funnel, washed with 50 ml. portions of heptane, isopropanol, methanol and dried overnight in a vacuum oven at 60° C. The dry white powdery polymer weighed 0.10 gram. The residue from evaporation of the combined heptane solutions weighed 0.8 gram. It will be noted in comparing the polymer yield in this example with the yield of Example 1 that there was a 27 fold increase in Example 1.

*Example 2*

A polymer bottle was charged with 5 ml. of heptane, 1.85 ml. of 0.97 M ethyl aluminum dichloride solution in heptane and 0.14 ml. (0.129 g.) of ethyl orthocarbonate. These amounts represent a ratio of 2.7:1 of ethyl aluminum dichloride to ethyl ortho carbonate. The bottle was capped and agitated in a 50° C. bath for 30 minutes. The bottle was removed from the bath and 1 paraffin pellet containing 0.069 gram of titanium trichloride was added to the solution. After agitating for an additional 90 minutes at room temperature the slurry was diluted with 45 ml. of heptane, placed in the 72° C. bath and pressured with 40 p.s.i.g. of propylene.

After 4 hours the unreacted propylene was vented and the polymer was isolated, washed and dried in the same manner as that described in Example 1. The yield of dry white powdery polymer amounted to 3.2 grams. The reduced solution viscosity of the polymer was 5.3. The residue from evaporation of the combined heptane solutions weighed 0.4 gram.

*Comparative Example B*

A polymer bottle was charged with 3 ml. of heptane, 1.95 ml. of 0.93 M ethyl aluminum dichloride solution in heptane and 1 paraffin pellet containing 0.069 gram of TiCl₃. After agitating for 90 minutes at 25° C., the slurry was diluted with an additional 47 ml. of heptane, capped, placed in the 72° C. bath and pressured with 40 p.s.i.g. of propylene.

After 4 hours, the unreacted propylene was vented and the polymer was isolated, washed and dried in the same manner as that described in Example A. The dry white powdery polypropylene weighed 0.08 gram. It will be noted that the polymer yield in Example 2 was increased 40 fold over that of this control.

*Example 3*

A polymer bottle was charged with 50 ml. of hexane, 0.75 ml. of 1.80 M ethyl aluminum sesquichloride solution in heptane and 0.056 ml. (0.051 gram) of ethyl orthocarbonate. These units represent a ratio of 5:1 of ethyl aluminum sesquichloride to ethyl orthocarbonate. The solution was agitated for 30 minutes at 25° C. One paraffin pellet containing 0.069 gram of titanium trichloride was added and the bottle was placed in the 72° C. bath. After aging for 10 minutes, the bottle was pressured with 40 p.s.i.g. of propylene for 4 hours. At the end of this period the unreacted propylene was vented and the polymer was isolated, washed and dried in the same manner as that described in Example 1. The yield of dry white powdery polypropylene amounted to 6.9 grams. The reduced solution viscosity of the polymer was 11.3. The residue from evaporation of the combined hexane solutions weighed 0.4 gram.

*Comparative Example C*

A polymer bottle was charged with 50 ml. of hexane, 0.75 ml. of 1.80 M ethyl aluminum sequichloride solution in heptane and 1 paraffin pellet containing 0.069 gram of titanium trichloride. The resulting slurry was aged in the 72° C. bath for 10 minutes, then pressured with 40 p.s.i.g. of propylene. After 4 hours the unreacted propylene was vented and the polymer was isolated, washed and dried in the same manner as that described in Example 1. The dry white powdery polypropylene weighed 2.8 grams and had a reduced solution viscosity of 5.3. The residue from evaporation of the combined hexane solutions weighed 0.6 gram. It will be noted that the polymer yield in Example 3 was increased 2½ fold over that of this control.

*Comparative Example D*

A polymer bottle was charged with 50 ml. of hexane, 1.8 ml. of 1.03 M ethyl aluminum dichloride solution in hexane and 1 paraffin pellet containing 0.069 gram of titanium trichloride. As in the previous examples, the bottle was sealed with a crown cap containing an oil resistant liner and placed in the constant temperature bath maintained at 72° C. As before, agitation was accomplished by means of a Teflon-coated magnetic stirrer.

After aging for 10 minutes, 20 ml. (13.2 grams) of 4-methyl-1-pentene was injected into the pressure bottle. The polymerization was run for 16 hours. The polymer was isolated, washed and dried in the same manner as that described for Example 1. The dry white powdery polymer weighed 0.50 gram and had a reduced solution viscosity of 4.2. The residue from evaporation of the combined hexane solutions weighed 1.7 grams.

*Example 4*

Example D was repeated except that the solution of ethyl aluminum dichloride was pretreated for 15 minutes at 25° C. with 0.058 ml. (0.054 gram) of trimethyl orthoacetate. These units represent a ratio of 4:1 of the aluminum compound to the ester. The yield of dry white poly-4-methyl-1 pentene amounted to 5.0 grams. Its reduced solution viscosity was 4.5. The residue from evaporation of the combined hexane solutions weighed 0.7 gram. It will be noted the polymer yield was increased 10 fold compared with the yield of Example D.

*Example 5*

A polymer bottle was charged with 50 ml. of heptane, 1.8 ml. of 1.03 M ethyl aluminum dichloride solution in heptane and 0.12 ml. (0.11 gram) of ethyl orthocarbonate. The mol ratio of the aluminum compound to the ester was 3:1. After aging with agitation for 30 minutes at 25° C., 1 paraffin pellet containing 0.069 gram of titanium trichloride was added. The bottle was then placed in the 72° C. bath and after aging the slurry for an additional 10 minutes, 20 ml. (13.2 grams) of 4-methyl-1-pentene was injected into the bottle. The polymerization was run for 16 hours. The polymer was isolated, washed and dried in the same manner as that described for Example 1. The dry white powdery polymer of 4-methyl-1-pentene weighed 5.5 grams. The residue from evaporation of the heptane-hexane solutions weighed 1.2 grams.

The invention claimed is:

1. In the polymerization of 1-alkenes having at least three carbon atoms to form solid crystalline polymers, the improvement which comprises catalyzing the polymerization with a product formed by mixing, in an inert solvent, an alkyl aluminum compound selected from the group consisting of alkyl aluminum dihalides and aluminum alkyl sesquihalides with an orthoester having the formula $ZC(OR)_3$ where Z is selected from the group consisting of a lower alkyl group and an alkoxy group having from 1 to 4 carbon atoms and R is an alkyl group having from 1 to 4 carbon atoms, and thereafter adding to the mixture titanium trichloride, wherein the mol ratio of alkyl aluminum compound to titanium trichloride is from about 0.2:1 to about 10:1, and the mol ratio of alkyl aluminum compound to the orthoester is from about 1.5:1 to about 6:1.

2. The process according to claim 1 wherein the mol ratio of the alkyl aluminum compound to the titanium trichloride is from about 1.5:1 to about 4:1.

3. The process according to claim 1 in which the titanium trichloride is predominantly amorphous.

4. The process according to claim 2 in which the alkene is propylene.

5. The process according to claim 1 wherein the orthoester is trimethyl orthoacetate.

6. The process according to claim 1 wherein the orthoester is ethyl orthocarbonate.

7. The process according to claim 1 in which the orthoester is trimethyl orthoacetate and the mol ratio of alkyl aluminum compound to the orthoester is from about 1.5:1 to about 6:1.

8. The process according to claim 1 in which the orthoester is ethyl orthocarbonate and the mol ratio of alkyl aluminum compounds to the orthoester is from about 1.5:1 to about 6:1.

9. The process according to claim 1 in which the alkyl aluminum compound is ethyl aluminum dichloride.

10. The process according to claim 1 in which the alkyl aluminum compound is ethyl aluminum sesquichloride.

11. A catalytic composition according to claim 19 wherein the mol ratio of the alkyl aluminum compound to the titanium trichloride is from about 1.5:1 to about 4:1.

12. A composition according to claim 19 in which the titanium trichloride is essentially amorphous.

13. A composition according to claim 19 in which the orthoester is trimethyl orthoacetate and the mol ratio of alkyl aluminum compound to the orthoester is from about 1.5:1 to about 6:1.

14. A composition according to claim 19 in which the alkyl aluminum compound is ethyl aluminum dichloride.

15. A composition according to claim 19 in which the alkyl aluminum compound is ethyl aluminum sesquichloride.

16. A composition according to claim 19 in which the ortho-ester is ethyl orthocarbonate.

17. A composition according to claim 19 in which the orthoester is ethyl orthocarbonate and the mol ratio of the ethyl aluminum dichloride compound to the ethyl orthocarbonate is from about 2.5:1 to about 4:1.

18. A composition according to claim 19 in which the orthoester is ethyl orthocarbonate and the alkyl aluminum halide is ethyl aluminum sesquichloride and the mol ratio from about 4:1 to about 6:1.

19. A catalytic composition formed by mixing, in an inert solvent, an alkyl aluminum compound selected from the group consisting of alkyl aluminum dihalides and aluminum alkyl sesquihalides with an orthoester having the formula $ZC(OR)_3$ where Z is selected from the group consisting of a lower alkyl group and an alkoxy group having from 1 to 4 carbon atoms and R is an alkyl group having from 1 to 4 carbon atoms, and thereafter adding to the mixture titanium trichloride, wherein the mol ratio of alkyl aluminum compound to titanium trichloride is from about 0.2:1 to about 10:1, and the mol ratio of alkyl aluminum compound to the orthoester is from about 1.5:1 to about 6:1.

References Cited in the file of this patent

UNITED STATES PATENTS

| | | |
|---|---|---|
| 2,965,627 | Field et al. | Dec. 20, 1960 |
| 3,008,948 | Stampa et al. | Nov. 14, 1961 |